US011901674B2

(12) United States Patent
Yang et al.

(10) Patent No.: US 11,901,674 B2
(45) Date of Patent: Feb. 13, 2024

(54) HIGH-VOLTAGE CONNECTOR AND ELECTROMAGNETIC SHIELDING SHELL FOR HIGH-VOLTAGE CONNECTOR

(71) Applicant: TYCO ELECTRONICS (SHANGHAI) CO., LTD., Shanghai (CN)

(72) Inventors: Yuchen Yang, Shanghai (CN); Mengyu Zhang, Shanghai (CN); Jianxiong Li, Shanghai (CN); Kaixuan (Evan) Jiang, Shanghai (CN); Haomai (Ivan) Yin, Shanghai (CN); Xiao (Nichee) Zhou, Shanghai (CN)

(73) Assignee: TYCO ELECTRONICS (SHANGHAI) CO., LTD., Shanghai (CN)

( * ) Notice: Subject to any disclaimer, the term of this patent is extended or adjusted under 35 U.S.C. 154(b) by 205 days.

(21) Appl. No.: 17/511,755

(22) Filed: Oct. 27, 2021

(65) Prior Publication Data

US 2022/0140542 A1 May 5, 2022

(30) Foreign Application Priority Data

Oct. 30, 2020 (CN) ......................... 202022457590.4

(51) Int. Cl.
*H01R 13/658* (2011.01)
*H01R 13/6582* (2011.01)
(Continued)

(52) U.S. Cl.
CPC ....... *H01R 13/6582* (2013.01); *H01R 13/502* (2013.01); *H01R 13/53* (2013.01)

(58) Field of Classification Search
CPC .. H01R 13/6582; H01R 13/502; H01R 13/53; H01R 13/514
(Continued)

(56) References Cited

U.S. PATENT DOCUMENTS 7,959,468 B2 * 6/2011 Yong ................ H01R 13/65918 439/607.41
8,052,470 B1 * 11/2011 Lin ...................... H01R 13/648 439/607.58
(Continued)

FOREIGN PATENT DOCUMENTS

CN 109411905 A * 3/2019
JP H0997647 A 4/1997
(Continued)

OTHER PUBLICATIONS

Extended Search Report for French Application No. FR2111410 dated Oct. 21, 2022.

*Primary Examiner* — Peter G Leigh
(74) *Attorney, Agent, or Firm* — Potomac Law Group, PLLC

(57) ABSTRACT

The present application provides a high-voltage connector and an electromagnetic shielding shell for the high-voltage connector, the electromagnetic shielding shell has an integrated barrel-shaped structure formed by a deep drawing process, and integrated barrel-shaped structure includes a barrel wall and a barrel bottom that are connected to each other. By providing an integrated barrel-shaped structure formed by the deep drawing process, the entire electromagnetic shielding shell does not have structural slits, thereby improving the current passing capacity and electromagnetic shielding performance, and there is no overlap of multiple sheet metal materials in the structure of the electromagnetic shielding shell, and can increase the thickness of the electromagnetic shielding shell under the same conditions, and it can also make the structure thickness of the electromagnetic shielding shell have better uniformity, avoid the situation of thick local structure, and the space occupied by the electromagnetic shielding shell in the high-voltage connec-
(Continued)

tor is reduced and materials are saved, which can reduce the material cost and manufacturing cost of the product.

18 Claims, 2 Drawing Sheets

(51) Int. Cl.
*H01R 13/502* (2006.01)
*H01R 13/53* (2006.01)

(58) Field of Classification Search
USPC .................................................... 439/607.01
See application file for complete search history.

(56) References Cited

U.S. PATENT DOCUMENTS 8,083,548 B1 * 12/2011 Lin ...................... H01R 13/506
439/219
8,182,288 B1 * 5/2012 Lin .................... H01R 13/6588
439/607.01
2020/0176935 A1 * 6/2020 Azad .................... H01R 13/426

FOREIGN PATENT DOCUMENTS

JP 2010165512 A * 7/2010 ......... H01R 13/5205
KR 20190069729 A 6/2019

* cited by examiner

HIGH-VOLTAGE CONNECTOR AND ELECTROMAGNETIC SHIELDING SHELL FOR HIGH-VOLTAGE CONNECTOR

TECHNICAL FIELD

The present application relates to the technical field of connector, and more particularly to a high-voltage connector and an electromagnetic shielding shell for the high-voltage connector.

BACKGROUND OF INVENTION

At present, the shielding shell of the shielded high-voltage connector for automobiles uses sheet metal and is formed through a bending process. The bending structure is complicated and there are requirements for structural slits. Therefore, it is necessary to overlap multiple layers of sheet metal materials after bending, which causes the partial structure of the shielding shell to be thicker, and increases the material cost and manufacturing cost of the product.

SUMMARY OF INVENTION

An object of the present application is to provide an electromagnetic shielding shell for a high-voltage connector, to solve the technical problem that the partial structure of the shielding shell is thicker, and the material cost and manufacturing cost of the product is increased in the prior art.

To achieve above object, the technical solution used in the present application is that: an electromagnetic shielding shell, configured for a high-voltage connector, which includes an integrated barrel-shaped structure, the integrated barrel-shaped structure includes a barrel wall and a barrel bottom that are connected to each other.

Optionally, the barrel bottom is provided with a plurality of through holes configured for terminals to pass through.

Optionally, an outer surface of the barrel bottom is provided with protection rings of the same number as the through holes, and the protection rings surrounds peripheral edges of the through holes, and continuously extends from the barrel bottom along an axial direction of the barrel-shaped structure.

Optionally, the protection rings and the barrel bottom are integrally formed.

Optionally, the barrel bottom is provided with a plurality of clamping holes configured for fixing the electromagnetic shielding shell.

Optionally, the barrel bottom is circular, a number of the clamping holes is three, and the three clamping holes are distributed at equal intervals around a center of the barrel bottom in a ring shape.

Optionally, the barrel wall is continuously extended along an axial direction and a circumferential direction of the integrated barrel-shaped structure, respectively.

Optionally, the barrel wall is provided with inner and outer surfaces that are extending smoothly and continuously.

Optionally, the integrated barrel-shaped structure has a uniform wall thickness.

Optionally, the barrel wall has a same wall thickness along a circumferential direction of the integrated barrel-shaped structure.

Optionally, the integrated barrel-shaped structure is a structure formed by a deep drawing process.

The present application further provides a high-voltage connector, which includes a connector housing and the electromagnetic shielding shell above described; the electromagnetic shielding shell is arranged inside the connector housing; and the barrel opening of the barrel-shaped structure is arranged at a mating end of the high-voltage connector.

The embodiments of the present application have at least the following beneficial effects: by providing an integrated barrel-shaped structure, the entire electromagnetic shielding shell does not have structural slits, thereby improving the current passing capacity and electromagnetic shielding performance, and there is no overlap of multiple sheet metal materials in the structure of the electromagnetic shielding shell, and can increase the thickness of the electromagnetic shielding shell under the same conditions, and it can also make the structure thickness of the electromagnetic shielding shell have better uniformity, avoid the situation of thick local structure, and the space occupied by the electromagnetic shielding shell in the high-voltage connector is reduced and materials are saved, which can reduce the material cost and manufacturing cost of the product.

BRIEF DESCRIPTION OF THE DRAWINGS

In order to more clearly describe the technical solutions in the embodiments of the present application, the following will briefly introduce the drawings needed in the description of the embodiments or the prior art. Obviously, the drawings in the following description are only of the present application. For some embodiments, those of ordinary skill in the art can obtain other drawings based on these drawings without creative labor.

Figure 1:
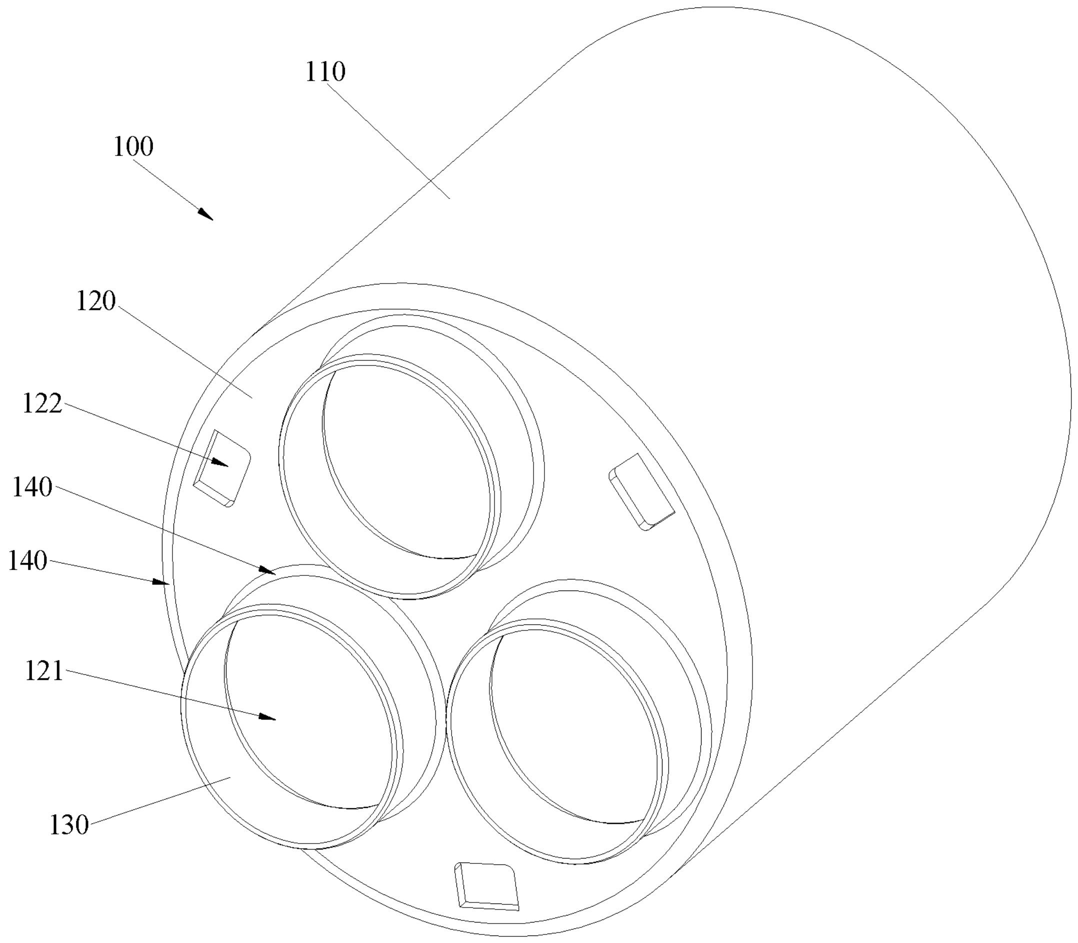
FIG. 1 is a structural schematic view of a viewing angle of an embodiment of the present application.

In the drawings, the reference signs are listed:

100—integrated barrel-shaped structure; 110—barrel wall; 120—barrel bottom; 121—through hole; 122—champing hole; 130—protection ring; 140—rounded structure.

DETAILED DESCRIPTION OF EMBODIMENTS

To make the technical problems, technical solutions, and beneficial effects to be solved by the present application clearer, the following further describes the present application in detail with reference to the accompanying drawings and embodiments. It should be understood that the specific embodiments described here are only used to explain the present application, and are not used to limit the present application.

It should be noted that when a component is referred to as being “fixed on” or “arranged on” another component, it can be directly on the other component or indirectly on the other component. When a component is said to be “connected” to another component, it can be directly or indirectly connected to the other component. The terms “upper”, “lower”, “left”, “right”, etc. indicate the orientation or positional relationship based on the orientation or positional relationship shown in the drawings, and are only for ease of description, and do not indicate or imply the device or the element must have a specific orientation, be constructed and operated in a specific orientation, and therefore cannot be understood as a limitation of the present application. For those skilled in the art, the specific meaning of the above terms can be understood according to specific conditions. The terms “first” and “second” are only used for ease of description, and cannot be understood as indicating or implying relative importance or implicitly indicating the number of technical features. The meaning of "plurality" means two or more than two, unless otherwise specifically defined.

Figure 2:
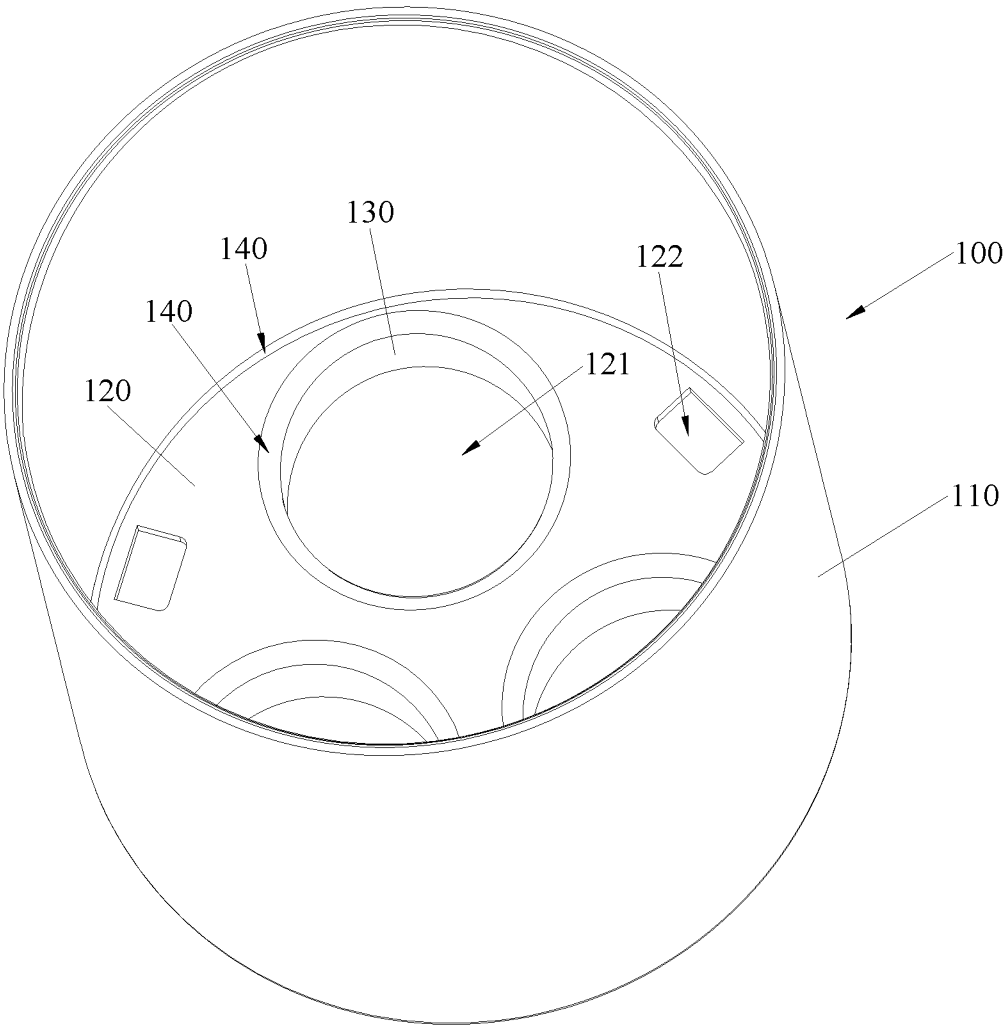
FIG. 2 is a structural schematic view of another viewing angle of an embodiment of the present application.

One of the embodiments of the present application is an electromagnetic shielding shell for a high-voltage connector, as shown in FIGS. 1 and 2, including an integrated barrel-shaped structure 100 that includes a barrel wall 110 and a barrel bottom 120 that are connected to each other.

The embodiments of the present application provide an integrated barrel-shaped structure including the barrel wall 110 and the barrel bottom 120, the entire electromagnetic shielding shell does not have structural slits, thereby improving the current passing capacity and electromagnetic shielding performance, and there is no overlap of multiple sheet metal materials in the structure of the electromagnetic shielding shell, and can increase the thickness of the electromagnetic shielding shell under the same conditions, and it can also make the structure thickness of the electromagnetic shielding shell have better uniformity, avoid the situation of thick local structure, and the space occupied by the electromagnetic shielding shell in the high-voltage connector is reduced and materials are saved, which can reduce the material cost and manufacturing cost of the product.

In one of the embodiments, the barrel bottom 120 is provided with a plurality of through holes 121 for the terminals to pass through, so that the terminals in the high-voltage connector can pass through the electromagnetic shielding shell to meet the structural requirements of some high-voltage connectors. In some other embodiments, the barrel bottom 120 may not be provided with the through holes 121. At this time, the terminals in the high-voltage connector can also pass through the electromagnetic shielding shell through the opening of the integrated barrel-shaped structure 100, which meets the structure need of some high-voltage connectors.

In one of the embodiments, the outer surface of the barrel bottom 120 is provided with the same number of protection rings 130 as the through holes 121, and the protection rings 130 surrounds peripheral edges of the through holes 121, and continuously extends from the barrel bottom 120 along an axial direction of the integrated barrel-shaped structure 100.

The terminals in the high-voltage connector can pass through the through holes 121 of the barrel bottom 120 and then can pass through the protective rings 130 on the outer surface of the barrel bottom 120. The protective rings 130 can protect and limit the terminals, such that the structure passing through the electromagnetic shielding shell is more stable, to prevent the terminals from bending or deforming.

In one of the embodiments, the junction between the outer surface of the barrel bottom 120 and the outer surface of the barrel wall 110 and/or the junction between the inner surface of the barrel bottom 120 and the inner surface of the barrel wall 110 is provided with a rounded structure 140 to reduce the stress concentration at the junction of the barrel bottom 120 and the barrel wall 110, which facilitates the assembly of the electromagnetic shielding shell and optimizes the current flow path.

In one of the embodiments, the junction between the outer surface of the barrel bottom 120 and the outer surface of the protection ring 130 and/or the junction between the inner surface of the barrel bottom 120 and the inner surface of the protection ring 130 is provided with a rounded structure 140 to reduce the stress concentration at the junction between the barrel bottom 120 and the protection ring 130, which facilitates the assembly of the terminals and optimizes the current flow path.

In one of the embodiments, the number of the through holes 121 and the protection rings 130 are both provided with one or two, so that the electromagnetic shielding shell can pass through one or two terminals.

In one of the embodiments, there are three through holes 121 and protection rings 130, so that the electromagnetic shielding shell can pass through the three terminals.

In one of the embodiments, the barrel bottom 120 is arranged in a circular shape, and the three through holes 121 and the three protection rings 130 are all distributed at equal intervals around a center of the barrel bottom 120 in a ring shape, so that the distribution of the structure and weight of the electromagnetic shielding shell is more even, and the three terminals of the high-voltage connector can pass through the electromagnetic shielding shell neatly.

In one of the embodiments, the barrel bottom 120 is provided with a plurality of clamping holes 122 for fixing the electromagnetic shielding shell. Correspondingly, a number of hooks are provided in the shell of the high-voltage connector to engage with the clamping holes 122 of the barrel bottom 120. During assembly, the hooks of the shell of the high-voltage connector are snapped into the clamping holes 122 of the barrel bottom 120 of the electromagnetic shielding shell. The electromagnetic shielding shell can be fixed into the high-voltage connector, the structure is simple and easy to install.

In one of the embodiments, the barrel bottom 120 is circular, and the clamping holes 122 are provided with three. The three clamping holes 122 are distributed at equal intervals around the center of the bottom 120 in a ring shape, so that the electromagnetic shielding shell can be more firmly installed in the high-voltage connector.

In one of the embodiments, the barrel wall 110 is continuously extended along the axial and circumferential directions of the integrated barrel-shaped structure 100, so that the entire barrel wall 110 is structurally free from openings and seals, which can have a better electromagnetic shielding effect.

In one of the embodiments, the barrel wall 110 is provided with inner and outer surfaces extended smoothly and continuously, so that neither the inner surface nor the outer surface of the barrel wall 110 has any protrusions or recesses, thereby reducing material costs and manufacturing costs.

In one of the embodiments, the integrated barrel-shaped structure 100 has a uniform wall thickness, the structure is simple and easy to install, and the current flows through the integrated barrel-shaped structure 100 more smoothly.

In one of the embodiments, the barrel wall 110 has the same wall thickness along the circumferential direction of the integrated barrel-shaped structure 100, the structure is simple and easy to install, and the current flows through the barrel wall 110 more smoothly.

In one of the embodiments, the integrated barrel-shaped structure 100 is a structure formed by a deep drawing process. The deep drawing process is also called deep drawing, drawing or calendaring process, and belongs to one of the stamping processes, which is a stamping processing method that uses a mold to turn the blank into a hollow part with openings. The deep drawing process can be used to make thin-walled parts in the shape of barrel, step, cone, sphere, box, etc.; when comparing to the process made by turning and other processes, the integrated barrel-shaped structure 100 is made by deep drawing process, the process is simple and the cost is lower, and it can have a uniform wall thickness and a smooth surface.

The embodiment of the present application also provides a high-voltage connector, which includes a connector housing and an electromagnetic shielding housing as described above. The electromagnetic shielding housing is arranged inside the connector housing. The barrel opening of the integrated barrel-shaped structure 100 is arranged at the mating end of the high-voltage connector. The high-voltage connector can have better current passing capacity and electromagnetic shielding performance, and the electromagnetic shielding shell occupies less space in the high-voltage connector, saves materials, and can reduce material costs and manufacturing costs.

The above are only some embodiments of the present application and are not intended to limit the present application, and any modification, equivalent replacement and improvement made within the spirit and principle of this application shall be included within the protection scope of the present application.

What is claimed is:

1. An electromagnetic shielding shell configured for a high-voltage connector, the electromagnetic shielding shell comprising an integrated barrel-shaped structure; wherein the integrated barrel-shaped structure comprises a barrel wall and a barrel bottom that are integrated to each other; wherein the barrel bottom is provided with a plurality of clamping holes configured for fixing the electromagnetic shielding shell.

2. The electromagnetic shielding shell according to claim 1, wherein the barrel bottom is formed with a plurality of through holes for terminals to pass through.

3. The electromagnetic shielding shell according to claim 2, wherein an outer surface of the barrel bottom is formed with protection rings of the same number as the through holes, and wherein the protection rings surround peripheral edges of the through holes and continuously extend from the barrel bottom along an axial direction of the barrel-shaped structure.

4. The electromagnetic shielding shell according to claim 3, wherein the protection rings and the barrel bottom are integrally formed.

5. The electromagnetic shielding shell according to claim 1, wherein the barrel bottom is circular, a number of the clamping holes is three, and the three clamping holes are distributed at equal intervals around a center of the barrel bottom in a ring shape.

6. The electromagnetic shielding shell according to claim 1, wherein the barrel wall is continuously extended along an axial direction and a circumferential direction of the integrated barrel-shaped structure, respectively.

7. The electromagnetic shielding shell according to claim 1, wherein the barrel wall is provided with inner and outer surfaces that are extending smoothly and continuously.

8. The electromagnetic shielding shell of claim 1, wherein the integrated barrel-shaped structure has a uniform wall thickness.

9. The electromagnetic shielding shell according to claim 1, wherein the barrel wall has a same wall thickness along a circumferential direction of the integrated barrel-shaped structure.

10. The electromagnetic shielding shell according to claim 1, wherein the integrated barrel-shaped structure is a structure formed by a deep drawing process.

11. A high-voltage connector, comprising:

a connector housing; and an electromagnetic shielding shell comprising an integrated barrel-shaped structure;

wherein the integrated barrel-shaped structure comprises a barrel wall and a barrel bottom that are integrated to each other, the barrel wall is continuously extending long an axial and circumferential direct of the integrated barrel-shaped structure, the barrel wall is free from openings and seals;

wherein the electromagnetic shielding shell is arranged inside the connector housing; and a barrel opening of the barrel-shaped structure is arranged at a mating end of the high-voltage connector.

12. The high-voltage connector according to claim 11, wherein a first rounded structure is provided between the barrel wall and the barrel bottom wall, the first rounded structure reduces the stress concentration at the junction of the barrel wall and the barrel bottom wall.

13. The high-voltage connector according to claim 12, wherein the first rounded structure is provided between an outer surface of the barrel bottom and an outer surface of the barrel wall.

14. The high-voltage connector according to claim 12, wherein the first rounded structure is provided between an inner surface of the barrel bottom and an inner surface of the barrel wall.

15. The high-voltage connector according to claim 12, wherein the barrel bottom is formed with protection rings, wherein the protection rings surround peripheral edges of through holes and continuously extend from the barrel bottom along an axial direction of the barrel-shaped structure.

16. The high-voltage connector according to claim 15, wherein a second rounded structure is provided between the barrel wall and the protection ring, the second rounded structure reduces the stress concentration at the junction of the barrel wall and the protection ring.

17. The high-voltage connector according to claim 16, wherein the second rounded structure is provided between an outer surface of the barrel bottom and an outer surface of the protection ring.

18. The high-voltage connector according to claim 16, wherein the second rounded structure is provided between an inner surface of the barrel bottom and an inner surface of the protection ring.

* * * * *